J. ARRINGTON.
Walking Planter.
No. 100,001. Patented Feb. 22, 1870.
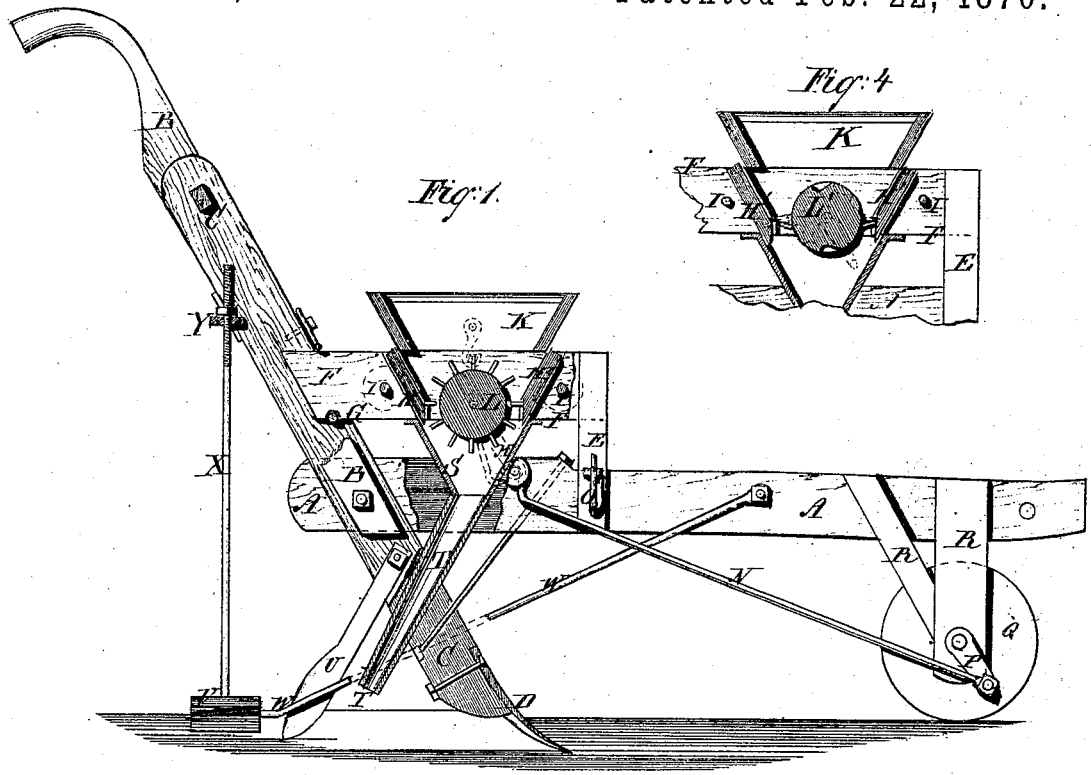
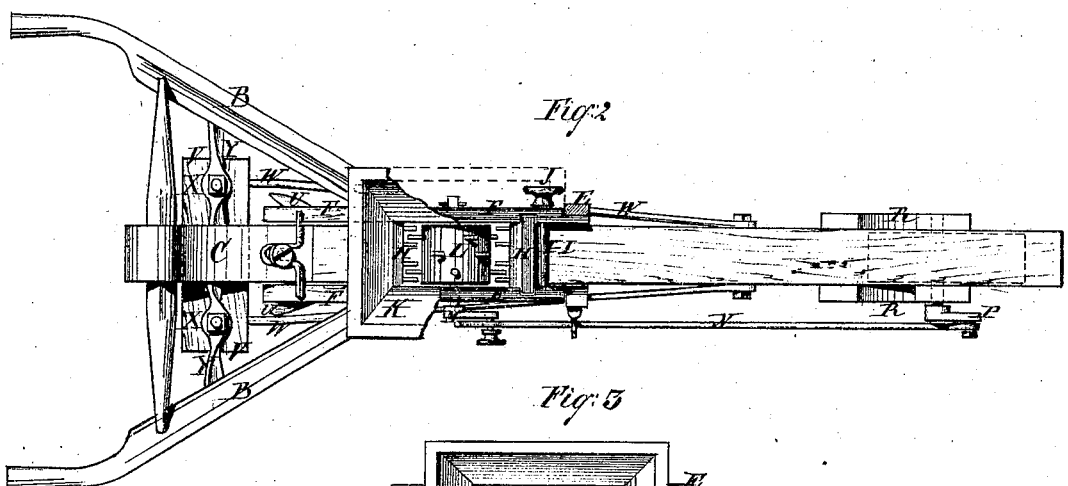
Witnesses:
C. Raettig
Edgar Tate
Inventor:
J. Arrington
per
Mmm L
Attorneys.

UNITED STATES PATENT OFFICE.

JOSEPH ARRINGTON, OF LIVINGSTON, ALABAMA.

IMPROVEMENT IN SEED-PALNTERS AND FERTILIZER-DISTRIBUTERS.

Specification forming part of Letters Patent No. 100,001, dated February 22, 1870.

*To all whom it may concern:*

Be it known that I, JOSEPH ARRINGTON, of Livingston, in the county of Sumter and State of Alabama, have invented a new and useful Improvement in Seed-Planters and Fertilizer-Distributers; and I do hereby declare that the following is a full, clear, and exact description thereof, which will enable others skilled in the art to make and use the same, reference being had to the accompanying drawings, forming part of this specification, in which—

Figure 1 is a side view of my improved machine, parts being broken away to show the construction. Fig. 2 is a top view of the same, parts being broken away to show the construction. Fig. 3 is a detail top view of the dropping device, showing it adjusted for distributing a fertilizer. Fig. 4 is a detail sectional view of the same, taken through the line *x x*, Fig. 3.

Similar letters of reference indicate corresponding parts.

My invention has for its object to furnish a simple, convenient, and effective machine which shall be so constructed and arranged that it may be easily and conveniently adjusted for planting cotton-seed or other seed or for distributing guano or other fine fertilizer, doing its work well and thoroughly in either capacity; and it consists in the construction and combination of various parts of the machine, as hereinafter more fully described.

A is the plow-beam, B are the handles, and C is the plow-standard, to the lower end of which the opening or furrowing plow D is attached, about the construction of which parts there is nothing new.

To the plow-beam A are attached the lower ends of the standards or supports E, with the upper ends of which are connected the forward ends of the bar F. The rear ends of the bar F are placed one upon each side of the standard C, in which position they are supported by a pin, G, which passes through the said standard and enters notches in the lower edges of the said bars F. The bars F are secured in place upon the pin G by a slide connected with the standard C, and which may be pushed down to rest upon the bars F or drawn up to allow said bars to be removed.

H are the feed-boards, which are placed in inclined grooves in the inner sides of the bars F, and are adjustably secured in place by the bolts I and thumb-nuts J, said bolts I passing through the said bars F, as shown in the drawings.

K is the hopper, which rests upon the bars F, and is detachably secured in place by hooks, as shown in dotted lines in Fig. 1.

L is a roller, the journals of which work in bearings in the bars F, and to which is attached a series of projecting pins or spikes, which pass between similar pins or spikes projecting from the lower parts of the feed-boards H, between the lower parts of which boards the said roller works.

To the projecting end of one of the journals of the roller L is attached, or upon it is formed, a crank, M, to the crank-pin of which is pivoted a connecting-rod, N, either by forming a hole in said rod to receive the crank-pin or by forming a notch or loop in said rod to receive and ride upon said crank-pin. This latter construction I prefer, as it allows the connecting-rod N to be conveniently detached and placed upon the hook O, attached to the frame of the planter, so that the machine may be taken from place to place without operating the dropping device. The forward end of the rod N is pivoted to the crank-pin of the crank P, formed upon the end of one of the journals of the wheel Q, the journals of which revolve in bearings in the standards R, attached to the forward end of the plow-beam. The standards R may be adjustably attached to the beam A, so that the wheel Q may be raised or lowered to regulate the depth at which the machine works in the ground. The dropping device heretofore described is designed for use in planting cotton-seed, the spikes or pins drawing the seed out uniformly.

S is a small hopper placed beneath the bars F, and attached to the beams A, which receives the seed from the dropping device and guides it into the spout T, by which it is conducted to the ground just in the rear of the opening or furrowing plow D.

U are two covering-spades, attached to the sides of the standards C in such positions as to force inward the sides of the furrow and cover the seeds. The covering of the seeds is completed by the block or drag V, the lower side of which is concaved to give the proper form to the row, and which is attached to the rear ends of the draft-rods W, the forward ends of which are attached to the sides of the plow-beam A. The covering-block V is supported by the rods X, the lower ends of which are secured to said block V, and the upper ends of which have screw-threads cut upon them, pass up through holes in the bar Y, attached to the handles B and standard C, and have nuts placed upon them, so that by turning the said nuts in one or the other direction the block V may be raised or lowered to regulate the depth at which the seed is covered in the ground.

When the machine is to be used for distributing guano or other fine fertilizer, the spiked or toothed roller L and the spiked or toothed feed-boards H are detached, and the roller L', having cups or recesses formed in its face and being provided with a crank, and the feed-boards H', provided with brushes, as shown in Figs. 3 and 4, are used in their places. The latter dropping devices, L' H', may also be used for dropping seeds other than cotton-seed, the size of the recesses in the roller L' being regulated by the size or quantity of seed to be dropped. When the machine is to be used for distributing a fertilizer, the covering device V W X U may be detached.

The crank P of the wheel Q should be made shorter than the crank of the dropping-cylinder, so that the dropping cylinder or roller may not be revolved, but only turned or rocked through so much of a revolution as will transfer the seed or fertilizer to the guide-hopper S and conductor-spout T.

Having thus described my invention, I claim as new and desire to secure by Letters Patent—

1. The combination and arrangement of the detachable hopper K, detachable bars F, detachable feed-boards H, whether provided with teeth or brushes, dropping roller or cylinder L, whether provided with teeth or recesses, guide-hopper S, conducting-spout T, crank M, connecting-rod N, crank P, and gage-wheel Q, with each other and with the plow-frame A B C, substantially as herein shown and described, and for the purpose set forth.

2. In combination with the hopper S, spout T, opening-plow D, and the frame A B C, the covering-block V, when arranged to be adjusted vertically by means of rods x, bar Y, and screw-nuts, whereby said coverer maintains a fixed relation to the plows, as shown and described.

JOSEPH ARRINGTON.

Witnesses:
H. W. NORVILL,
W. A. C. JONES.